United States Patent
Makaino et al.

(10) Patent No.: US 11,632,073 B2
(45) Date of Patent: Apr. 18, 2023

(54) ROTATING MACHINE DRIVE SYSTEM AND CONTROL METHOD FOR ROTATING MACHINE DRIVE SYSTEM

(71) Applicant: Hitachi Industrial Equipment Systems Co., Ltd., Tokyo (JP)

(72) Inventors: Yuki Makaino, Tokyo (JP); Nobuyuki Narisawa, Tokyo (JP); Kenta Deguchi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 8 days.

(21) Appl. No.: 17/419,936

(22) PCT Filed: May 26, 2020

(86) PCT No.: PCT/JP2020/020780
§ 371 (c)(1),
(2) Date: Jun. 30, 2021

(87) PCT Pub. No.: WO2020/261840
PCT Pub. Date: Dec. 30, 2020

(65) Prior Publication Data
US 2022/0069759 A1 Mar. 3, 2022

(30) Foreign Application Priority Data
Jun. 25, 2019 (JP) ............................. JP2019-117677

(51) Int. Cl.
*H02P 29/032* (2016.01)
(52) U.S. Cl.
CPC .................. *H02P 29/032* (2016.02)
(58) Field of Classification Search
CPC ...... H02P 29/032; G05B 23/02; G01M 13/02; G01M 17/00; G01M 7/021; H02K 7/10;
(Continued)

(56) References Cited

U.S. PATENT DOCUMENTS

| | | | |
|---|---|---|---|
| 6,029,512 A | 2/2000 | Suganuma et al. | |
| 2020/0284690 A1* | 9/2020 | Kanemaru | H02P 29/0241 |

FOREIGN PATENT DOCUMENTS

| | | |
|---|---|---|
| DE | 10 2012 002 693 A1 | 8/2013 |
| JP | 8-100765 A | 4/1996 |

(Continued)

OTHER PUBLICATIONS

International Search Report (PCT/ISA/210) issued in PCT Application No. PCT/JP2020/020780 dated Aug. 18, 2020 with English translation (six (6) pages).

(Continued)

*Primary Examiner* — Said Bouziane
(74) *Attorney, Agent, or Firm* — Crowell & Moring LLP

(57) ABSTRACT

A rotating machine drive system includes a power supply, an electric motor, a rotating machine, a belt drive transmission unit, an electrical information detection sensor, and a diagnostic unit. The electrical information detection sensor detects a current or a voltage. The diagnostic unit calculates estimated rotational speed information of the rotating machine based on the current or the voltage, calculates a reference rotational frequency from a rotational speed of the electric motor and a ratio between a diameter of the electric motor side pulley and a diameter of the rotating machine side pulley. The diagnostic unit uses a difference or a ratio between the estimated rotational speed information and the reference rotational frequency to determine whether or not there is the transmission abnormality.

12 Claims, 8 Drawing Sheets

(58) Field of Classification Search
CPC . B23Q 5/58; B23B 19/02; F02B 67/06; F02D 29/06; F16H 7/00; F04B 39/16; F04B 49/10
See application file for complete search history.

(56) References Cited

FOREIGN PATENT DOCUMENTS

| | | |
|---|---|---|
| JP | 10-150742 A | 6/1998 |
| JP | 2005-246534 A | 9/2005 |
| JP | 2010-206964 A | 9/2010 |
| WO | WO 2018/109993 A1 | 6/2018 |

OTHER PUBLICATIONS

Japanese-language Written Opinion (PCT/ISA/237) issued in PCT Application No. PCT/JP2020/020780 dated Aug. 18, 2020 (four (4) pages).

* cited by examiner ns, so that normal operation cannot be continued. For

ROTATING MACHINE DRIVE SYSTEM AND CONTROL METHOD FOR ROTATING MACHINE DRIVE SYSTEM

TECHNICAL FIELD

The present invention relates to a rotating machine drive system and a method for controlling a rotating machine drive system.

BACKGROUND ART

As a belt-driven rotating machine that receives the driving force of an electric motor transmitted by a belt, to be driven, there are numerous rotating machines such as a compressor, a chiller, and a fan. Even if the rotating machine is limited to the compressor, there are a wide variety of compressors such as a reciprocating air compressor, a scroll compressor, a screw compressor, and a pump compressor.

For example, in the reciprocating air compressor, an electric motor which provides a rotational force is connected to a compression mechanism via a power transmission belt and pulleys. The compression mechanism takes in air from a suction filter and causes a piston, which is provided in the compression mechanism, to reciprocate to compress the air. JP H8-100765 A (Patent Document 1) discloses a technique in which in such an air compressor, electrical information (current, voltage, or the like) is used to determine the state of a rotating machine, and when it has been determined that there is an abnormality, the rotating machine is controlled to eliminate the abnormality.

Patent Document 1 discloses a technique in which a load fluctuation is checked from a current applied to the electric motor, and when the load of the electric motor has decreased, a filter is determined to have a clogging abnormality, and when it has been determined that there is the abnormality, compressed air is supplied to the filter to remove dust adhering to the filter.

CITATION LIST

Patent Document

Patent Document 1: JP H8-100765 A

SUMMARY OF THE INVENTION

Problems to be Solved by the Invention

By the way, a rotating machine system (for example, the above reciprocating air compressor) in which the driving force of an electric motor is transmitted to a rotating machine by a belt is configured such that the belt for transmission of power is suspended between an electric motor side pulley which is directly connected to an electric motor shaft to output a rotational driving force and a rotating machine side pulley which provides a rotational driving force to a compression mechanism of the rotating machine. For this reason, with the progress of abrasion or degradation of the belt, the frictional force between the pulleys and the belt decreases and slips occur, so that insufficient transmission of the driving force occurs. In addition, breakage of or damage to the belt is generated due to long-term use, so that insufficient transmission of the driving force occurs. In such a case, the rotational driving force of the electric motor cannot be properly transmitted to the compression mechanism, so that normal operation cannot be continued. For example, in the case of the reciprocating air compressor, the compression of air by the compressor is insufficient, so that the air pressure cannot reach a predetermined pressure value.

Therefore, an object of the present invention is to provide a rotating machine drive system and a method for controlling a rotating machine drive system capable of diagnosing whether or not a transmission abnormality of a rotational driving force occurs in a belt drive transmission unit including pulleys and a belt which are present between an electric motor and a rotating machine.

Solutions to Problems

In order to solve the above problem, as one example of the present invention, there is provided a rotating machine drive system including: a power supply; an electric motor that is driven by electric power supplied from the power supply; a rotating machine; a belt drive transmission unit including an electric motor side pulley that outputs a rotational driving force of the electric motor, a rotating machine side pulley that drives the rotating machine, and a belt that is suspended between the electric motor side pulley and the rotating machine side pulley; an electrical information detection sensor that detects electrical information of the electric motor; and a diagnostic unit that determines whether or not a transmission abnormality of the rotational driving force occurs in the belt drive transmission unit, based on the electrical information, and outputs an abnormality detection signal when it has been determined that there is the transmission abnormality.

In addition, as another example of the present invention, there is provided a method for controlling a rotating machine drive system including a power supply, an electric motor that is driven by electric power supplied from the power supply, a rotating machine, a belt drive transmission unit including an electric motor side pulley that outputs a rotational driving force of the electric motor, a rotating machine side pulley that drives the rotating machine, and a belt that is suspended between the electric motor side pulley and the rotating machine side pulley, and an electrical information detection sensor that detects electrical information of the electric motor, the method including: determining whether or not a transmission abnormality of the rotational driving force occurs in the belt drive transmission unit, based on the detected electrical information; and outputting an abnormality detection signal when it has been determined that there is the transmission abnormality.

Other configurations of the present invention will be apparent from description of embodiments to be described later.

Effects of the Invention

According to the present invention, it is possible to realize the rotating machine drive system and the method for controlling a rotating machine drive system capable of reliably detecting a transmission abnormality of the rotational driving force in the belt drive transmission unit during an operation period of the rotating machine.

MODE FOR CARRYING OUT THE INVENTION

Hereinafter, specific modes for carrying out the present invention (hereinafter, referred to as "embodiments") will be described in detail with reference to the drawings. Incidentally, the present invention is not limited to embodiments to be described below. In addition, in each of the drawings to be used in the following description, the same reference signs are assigned to common devices and apparatuses, and the description of the devices, apparatuses, and operations which have been already described will be omitted.

First Embodiment

Figure 1:
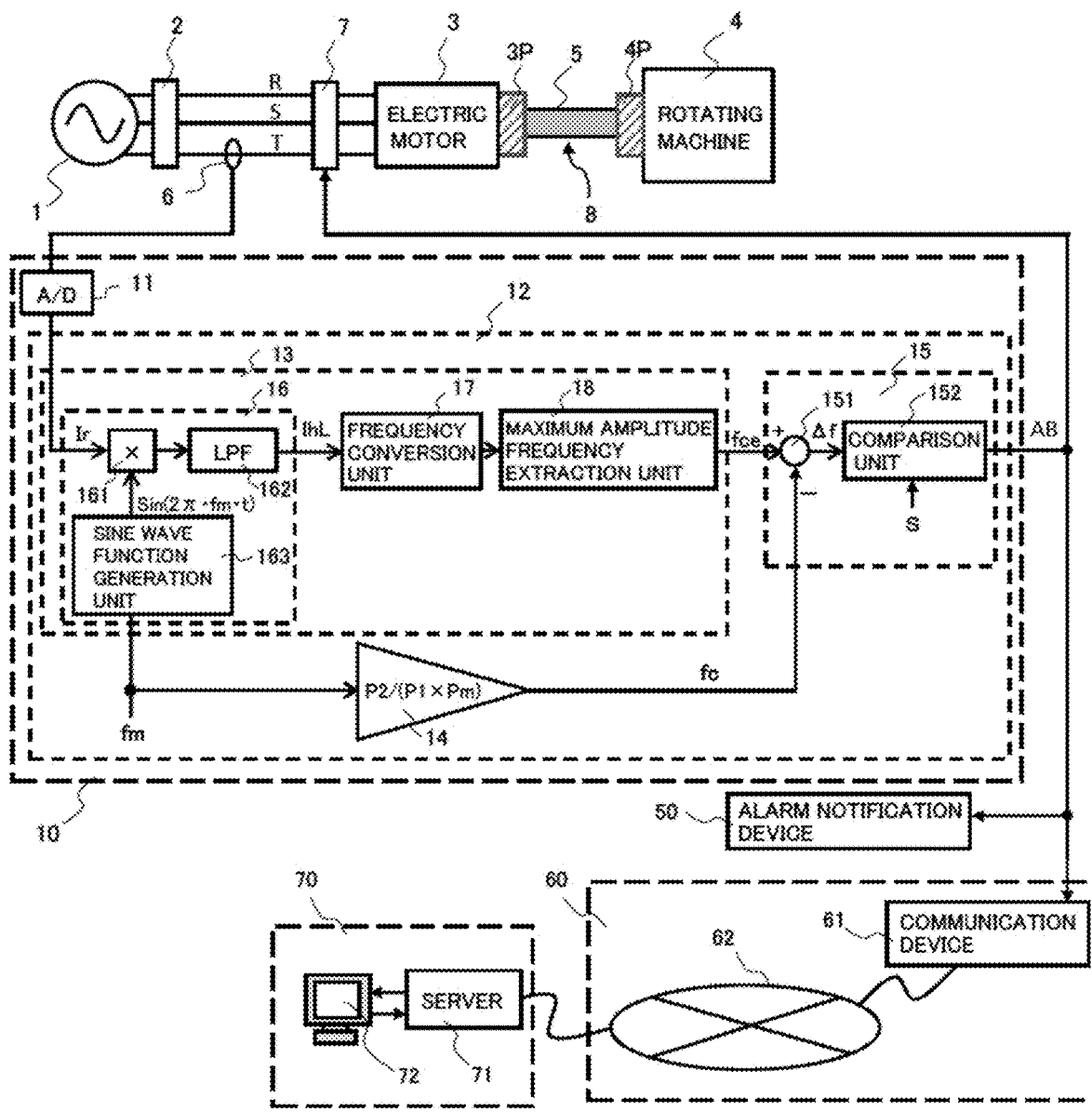
FIG. 1 is a view illustrating a rotating machine drive system according to a first embodiment of the present invention.
Figure 2:
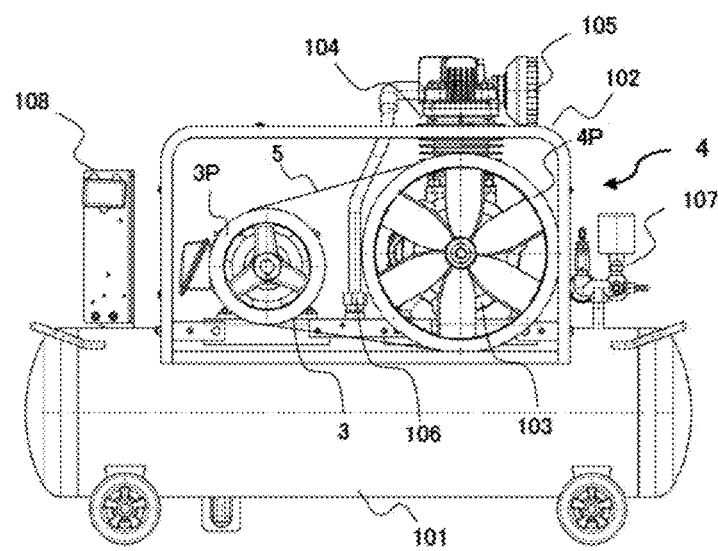
FIG. 2 is a view for describing a reciprocating air compressor according to the first embodiment.
Figure 3:
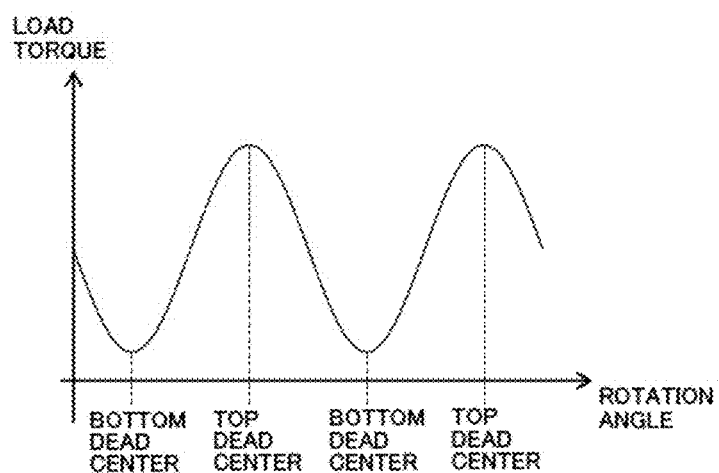
FIG. 3 is a graph for describing the periodic load torque of a rotating machine according to the first embodiment.
Figure 4:
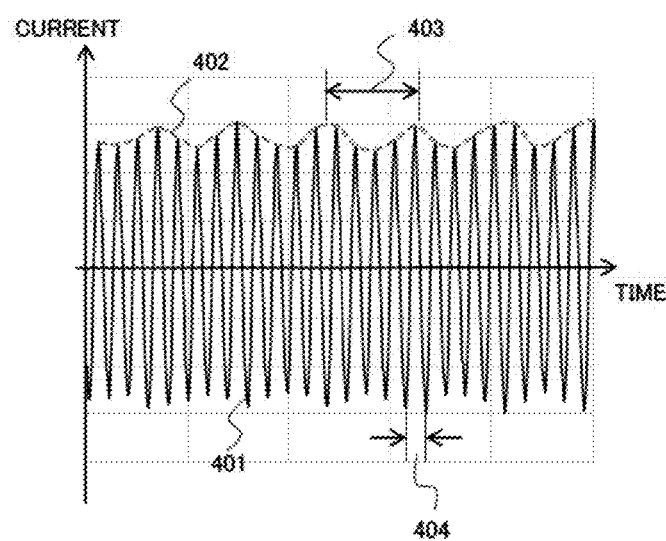
FIG. 4 is a graph for describing a current waveform of a diagnostic unit according to the first embodiment.

Next, a first embodiment of the present invention will be described with reference to FIGS. 1 to 4. FIG. 1 is a view illustrating a rotating machine drive system according to the first embodiment of the present invention. FIG. 2 is a view illustrating a reciprocating air compressor that is one example of a rotating machine in the first embodiment. FIG. 3 shows the load torque of the reciprocating air compressor. FIG. 4 is a graph for describing a current waveform of a diagnostic unit.

(Configuration of Rotating Drive System)

First, the configuration of the rotating machine drive system in the first embodiment will be described with reference to FIG. 1.

In FIG. 1, a three-phase AC power supply 1 supplies electric power to an electric motor 3 via a switch 2 that turns the power supply on and off. Namely, during start of operation, the switch 2 is operated to turn the power supply on, so that the electric motor 3 is rotationally driven by the electric power of the AC power supply 1. A three-phase AC electric motor (for example, induction electric motor) is used as the electric motor 3. Naturally, various other electric motors can be used as the electric motor 3. A circuit breaker shuts off electric power supplied to the electric motor 3 according to an abnormality detection signal AB that is output when a belt drive transmission unit 8 is abnormal. A rotating machine 4 receives the rotational driving force of the electric motor 3 from a belt 5 to be rotationally driven. In this embodiment, the rotating machine 4 is a "reciprocating air compressor". Incidentally, a schematic configuration of the reciprocating air compressor will be described later. The electric motor 3 includes a pulley 3P, and the rotating machine 4 also includes a pulley 4P. The belt 5 is suspended between the pulleys 3P and 4P, and the pulleys and the belt form the "belt drive transmission unit 8". Reference sign 6 denotes a current sensor. In this embodiment, an example will be described in which current (phase current in this example) is used as electrical information; however, the present invention can be similarly realized even when voltage is used. Namely, instead of the current sensor 6, a voltage sensor may be used.

Reference sign 10 denotes a diagnostic unit that diagnoses whether or not there is an abnormality in driving force of the belt drive transmission unit 8. The diagnostic unit 10 calculates an estimated rotational frequency fce of the rotating machine 4 based on the acquired electrical information (detected current of the current sensor 6 in this example). In addition, the diagnostic unit 10 uses the rotational speed (rotational frequency) of the electric motor and a ratio between the diameter of the pulley 3P of the electric motor and the diameter of the pulley of the rotating machine to calculate a reference rotational frequency fc that serves as a reference. The ratio between the diameters of the pulleys is a constant value, and is set in advance. The reference rotational frequency fc coincides with the rotational frequency of the rotating machine when belt transmission is normal. Then, when a difference (deviation) Δf between the estimated rotational frequency fce and the reference rotational frequency fc is compared with a threshold value S for determination which is stored in advance, and the difference Δf is larger than the threshold value S, the diagnostic unit 10 determines that there is a transmission abnormality of the rotational driving force in the belt drive transmission unit 8. A specific configuration and operation of the determination unit 10 will be described in detail later.

In FIG. 1, when the diagnostic unit 10 has output the abnormality detection signal AB indicating that there is a transmission abnormality of the rotational driving force in the belt drive transmission unit 8, an alarm notification device 50 causes a worker to recognize (be notified of) the fact. As the alarm notification device 50, for example, known devices such as a buzzer that generates a buzzer sound, a voice recognition device that makes a notification of the occurrence of an abnormality by voice, a lamp that makes a notification by light, and a display device that makes a notification by screen display can be used. When the diagnostic unit 10 has output the abnormality detection signal AB indicating that there is a transmission abnormality of the driving force in the belt drive transmission unit 8, an information transmission unit 60 transmits information of the abnormality detection signal to a monitoring center 70 at a location (remote location) away from the rotating machine.

(Description of Reciprocating Air Compressor)

Next, the reciprocating air compressor which is the rotating machine 4 of the rotating machine system of the first embodiment will be described with reference to FIG. 2.

In FIG. 2, reference sign 101 denotes an air tank, and a compressor main body 102 and the electric motor 3 are installed on the air tank 101. The compressor main body 102 is provided with two compression mechanisms 104 including a crankcase 103 fixed to the air tank 101, cylinders, and pistons, and a suction port 105 that suctions air to be compressed.

The electric motor side pulley 3P is provided on a back surface of the compressor main body 102, and the belt 5 is suspended around the compressor main body 102 side pulley 4P that is connected to a back surface of the electric motor 3. With this configuration, when the electric motor 3 rotates, the belt drive transmission unit including the pulley 3P, the belt 5, and the pulley 4P transmits the rotational driving force of the electric motor 3 to the compressor main body 102 to cause the compressor main body 102 to rotate, and the compression mechanisms 104 operates. As the compressor main body 102 rotates, four steps including the suction of air, the compression of the air, the discharge of the compressed air, and the expansion of the air are repeated. Specifically, in the compressor main body 102, air suctioned from the suction port 105 is compressed by the compression mechanisms 104. Then, the compressed air is stored in the air tank 101 via a discharge pipe 106.

FIG. 3 shows a schematic graph of a load torque waveform when the compressor main body 102 rotates. The torque is maximized at a rotation angle at which the piston has reached a top dead center while having compressed air, and the load torque is minimized at a bottom dead center at which an expansion stroke starts. In addition, the fluctuation period of the periodic load torque is synchronized with the rotational speed of the compressor main body 102. In FIG. 2, reference sign 107 denotes a pressure sensor, and when the pressure of the air tank 101 has exceeded a predetermined value, the circuit breaker 7 installed in a control device 108 is operated to stop the supply of electric power to the electric motor 3. Incidentally, in FIG. 1, this control is not illustrated. The control device 108 includes the current sensor 6 and the diagnostic unit 10 which are electrical information detection means, in addition to the circuit breaker 7.

(Abnormality Diagnosis Operation of Diagnostic Unit 10)

Next, an operation of the diagnostic unit 10 in FIG. 1 will be described. The diagnostic unit 10 can be realized by a computer, and in FIG. 1, processing in the computer is represented as a block diagram. Namely, when processing is performed in the computer, an internal memory stores a program that performs processing operations, and data information required for the processing (for example, the diameters of the pulleys, the frequency of the power supply, the number of pole pairs of the electric motor, and the like), and a central processing unit executes a series of processing operations using the program and the data information. In FIG. 1, in order to facilitate understanding of the operations, each of operation processes of the diagnostic unit 10 is represented as a functional block. In addition, here, description will be given based on the assumption that the electric motor 3 is a three-phase AC electric motor and wirings from the AC power supply 1 to the electric motor 3 are three wirings R, S, and T. Incidentally, the AC power supply may be a single-phase power supply, and the electric motor 3 may be a single-phase electric motor.

The current sensor 6 detects a current supplied to the electric motor 3. The rotational driving force of the electric motor 3 is transmitted to the rotating machine 4 by the belt drive transmission unit 8 including the electric motor side pulley 3P, the rotating machine side pulley 4P, and the belt 5. In the rotating machine 4 that generates periodic load torque, the amplitude of a current waveform changing at a current frequency fm [Hz] of the electric motor 3 is observed in a state where the amplitude is modulated at the frequency fc [Hz] by the periodic load torque of the rotating machine 4. When belt transmission is normal, namely, when no slips occur between the pulleys and the belt or when there is no damage to the belt or the like, the relationship between the current frequency fm and the rotational frequency fc of the rotating machine is represented as in equation (1). Here, reference sign P1 denotes the diameter of the electric motor side pulley 3P, and reference sign P2 denotes the diameter of the rotating machine 4 side pulley 4P. In addition, reference sign Pm denotes the number of pole pairs determined by the structure of the electric motor 3, and represents a coefficient for converting the rotational frequency of a mechanical motor shaft and the electrical frequency of the electric motor. Incidentally, the rotational frequency fm corresponding to the rotational speed of the electric motor can be known in advance from the frequency of AC power supplied to the electric motor. The rotational frequency fm may be detected by a sensor.

$$fc = P2/P1 \times fm/Pm \quad (1)$$

In FIG. 1, the diagnostic unit 10 includes an AD converter 11 that converts an analog signal into a digital signal, and a controller 12. The controller 12 can be realized by a computer as described above. The controller 12 has the function of an estimated rotational frequency calculation unit 13 that calculates the rotational frequency fce estimated from the current of the current sensor 6, the function of a reference rotational frequency calculation unit 14 that calculates the rotational frequency fc serving as a reference, and the function of an abnormality determination unit 15 that performs an abnormality determination based on two rotational frequencies. The calculation performed by the reference rotational frequency calculation unit 14 is as in equation (1) described above.

Next, a configuration for realizing the function of the estimated rotational frequency calculation unit 13 that calculates the rotational frequency fce estimated from a current Ir of the current sensor 6, and a calculation process thereof will be described.

First, the detected current Ir of the current sensor 6 is input to the estimated rotational frequency calculation unit in the controller 12 via the AD converter 11. When the current sensor 6 outputs a digital signal, the AD converter 11 is not required.

The estimated rotational frequency calculation unit 13 includes an envelope detection unit 16 that extracts an envelope signal IhL; a frequency conversion unit 17; and a maximum frequency extraction unit 18. The detected current Ir is input to the envelope detection unit 16, and the envelope detection unit 16 processes the current Ir to extract the envelope signal IhL. The envelope detection unit 16 performs heterodyne detection. In the heterodyne detection, as shown in equation (2), the detected current Ir is multiplied by a sine wave function that changes at the electrical frequency fm of the electric motor. A sine wave function generation unit 163 outputs the sine wave function using the electrical frequency fm of the electric motor. A multiplier 161 multiplies the current Ir by the sine wave function. Incidentally, the electrical frequency fm of the electric motor can be known in advance from the frequency of the AC power supply.

$$Ih = Ir \times \sin(2\pi \times fm \times t) \quad (2)$$

Here, description will be given based on the assumption that the current Ir follows the following equation.

$$Ir = \{Io \times \sin(2\pi \times fc \times t)\} \times \sin(2\pi \times fm \times t) \quad (3)$$

In equation (3), reference sign Io denotes the amplitude of current, and the left side term represents that the current of the amplitude Io changes at the frequency fc of equation (1). Half-angle formulas can be used to transform equation (2) into equation (4) from equation (3).

$$Ih = \{Io \times \sin(2\pi \times fc \times t)\} \times (1 - \cos(2 \times 2\pi \times fm \times t)/2 \quad (4)$$

When equation (4) is passed through a low-pass filter (LPF) 162 to remove a frequency component of 2fm [Hz], the envelope signal IhL changing at the frequency fc of the rotating machine is obtained from equation (5).

$$IhL = \{Io \times \sin(2\pi \times fc \times t)\}/2 \quad (5)$$

In such a manner, the envelope detection unit 16 calculates the envelope signal IhL.

FIG. 4 shows a current waveform. Here, a current waveform of one phase is illustrated, but currents of all phases may be detected. In FIG. 4, reference sign 401 denotes a detected current waveform, and reference sign 402 denotes an envelope signal. In addition, reference sign 403 denotes the pulsation period (=1/fc [s]) of the load torque of the rotating machine, and reference sign 404 denotes the electrical period (=1/fm [s]) of the electric motor.

Subsequently, the envelope signal IhL is converted into intensity at each frequency by the frequency conversion unit 17. Then, the maximum frequency extraction unit 18 extracts a frequency having the maximum amplitude to calculate the estimated rotational frequency fce of the rotating machine 4. The estimated rotational frequency calculation unit 13 outputs the calculated estimated rotational frequency fce of the rotating machine 4 to the abnormality determination unit 15.

Next, the abnormality determination unit 15 performs an abnormality determination based on the estimated rotational frequency fce that is a calculation output of the estimated rotational frequency calculation unit 13 which performs calculation, and the reference rotational frequency fc that is a calculation output of the reference rotational frequency calculation unit 14. In the abnormality determination, first, a subtraction unit 151 obtains the frequency deviation $\Delta f$ (=|fce−fc|). Then, the deviation $\Delta f$ is output to a comparison unit 152, and the deviation $\Delta f$ and the threshold value S for determination are compared with each other to perform an abnormality determination. Namely, when the deviation $\Delta f$ is larger than the threshold value S ($\Delta f$ S), the comparison unit 152 determines that a transmission abnormality of the rotational driving force has occurred in the belt drive transmission unit 8 due to slips between the pulleys and the belt, or the like. When the comparison unit 152 determines that there is a transmission abnormality, the abnormality determination unit 15 outputs an "abnormality detection signal" denoted by reference sign AB. Incidentally, the above-described rotational frequency [Hz] can be replaced with an angular rotational speed [rad/s], a rotational speed [min$^{-1}$], or the like.

In such a manner, the diagnostic unit 10 can reliably detect an abnormality in transmission of the driving force by the belt (transmission abnormality of the rotational driving force in the belt drive transmission unit 8) as an output of the abnormality determination unit 15. When an abnormality has been detected, the diagnostic unit 10 outputs the abnormality detection signal AB.

(Operation of System when Abnormality is Detected)

Next, responses of the system when the diagnostic unit 10 detects a transmission abnormality of the rotational driving force to output the abnormality detection signal AB will be described.

In FIG. 1, when the diagnostic unit 10 outputs the abnormality detection signal AB, an operation corresponding to a transmission abnormality is executed.

One of the responses is to cause the circuit breaker 7 to operate based on the output of the abnormality detection signal AB, to shut off the supply of electric power to the electric motor 3. Incidentally, in FIG. 1, a relay, an amplifier, and the like for operating the circuit breaker are omitted.

In addition, as another response, the abnormality detection signal AB is output to the alarm notification device 50, so that the alarm notification device 50 operates to notify a worker of an abnormality. As described above, known devices such as a buzzer, a voice recognition device, a lamp, and a display device can be used as the alarm notification device 50.

In addition, as further another response, when the monitoring center 70 which monitors the operation state of the system is far away from the installation location of the rotating drive system, in order to notify a worker in the monitoring center of an abnormality, the information transmission unit 60 including a communication device 61, a communication line 62, and the like is used to transmit the abnormality detection signal AB to the monitoring center 70. In this example, the abnormality detection signal AB is transmitted to a server 71 in the monitoring center 70, and a terminal device 72 executes an operation such as displaying content, which correspond to the abnormality detection signal AB, on a screen. In addition, in this case, the worker can also operate the terminal device 72 to instruct the rotating machine drive system to perform a proper response. Incidentally, here, the monitoring center 70 includes the server 71 and the terminal device 72, but is not limited to the configuration, and for example, the server 71 may not be provided and only the terminal device 72 may be provided. In that case, the abnormality detection signal AB is transmitted to the terminal device 72.

Incidentally, the embodiment illustrated in FIG. 1 is described as having a configuration in which all the responses can be carried out; however, it is not required to carry out all the responses, and only required responses may be performed according to situations. For example, any one of the above responses may be performed.

(Modification Example of First Embodiment)

Here, the diagnostic unit 10 described above illustrated in FIG. 1 only determines whether or not the transmission of the driving force of the belt drive transmission unit 8 is abnormal. However, it is possible to detect not only an abnormality determination but also a difference in the degree of an abnormality (abnormality level) in transmission of the rotational driving force. Namely, in order to detect a plurality of abnormality levels, a plurality of threshold values corresponding to the abnormality levels are prepared, and the frequency deviation $\Delta f$ and the threshold values are compared with each other, so that the abnormality determination unit 15 can detect abnormalities of a plurality of levels corresponding to the degrees of an abnormality.

For example, three types of threshold values S1, S2, and S3 (here, the sizing relationship among S1 to S3 is S1<S2<S3) corresponding to levels are prepared, and each of the threshold values and the frequency deviation $\Delta f$ are compared with each other. Then, the transmission of the rotational driving force can be determined as being "normal" in the case of S1<$\Delta f$, as "abnormality level 1" in the case of S1≤$\Delta f$<S2, as "abnormality level 2" in the case of S2≤$\Delta f$<S3, and as "abnormality level 3" in the case of S3<$\Delta f$.

Such a determination of the plurality of transmission abnormality levels is performed, so that control (speed control or stop control) of the electric motor can be performed according to the transmission abnormality levels. In addition, a notification corresponding to a transmission abnormality level can be also made to a worker.

In addition, in the embodiment of FIG. 1, an example is illustrated in which the deviation $\Delta f$ between the estimated rotational frequency fce and the reference rotational frequency fc is used; however, instead of the deviation $\Delta f$, a ratio therebetween can also be used to similarly carry out the present invention. In that case, the threshold value used by the comparison unit 152 may be set to a value corresponding to the ratio.

(Effects of First Embodiment)

As described in detail above, according to the first embodiment of the present invention, in the rotating machine drive system in which the belt is used to transmit the driving force, it is possible to detect occurrence of a transmission abnormality of the belt drive transmission unit 8 based on information of electricity (current or voltage) supplied to the electric motor, which is detected during operation. In the detection of an abnormality, only the electrical information may be detected, and it is not required to separately attach a rotation sensor or the like for detection of an abnormality, so that there is no increase in cost. In addition, when the diagnostic unit has detected an abnormality, it is possible to output an abnormality detection signal to notify a worker of occurrence of an abnormality in the belt drive transmission unit 8. In addition, it is possible to stop operation of the rotating machine drive system in an abnormal state due to an abnormality detection signal. In addition, it is possible to transmit an abnormality detection signal to a remote location.

Second Embodiment

Figure 5:
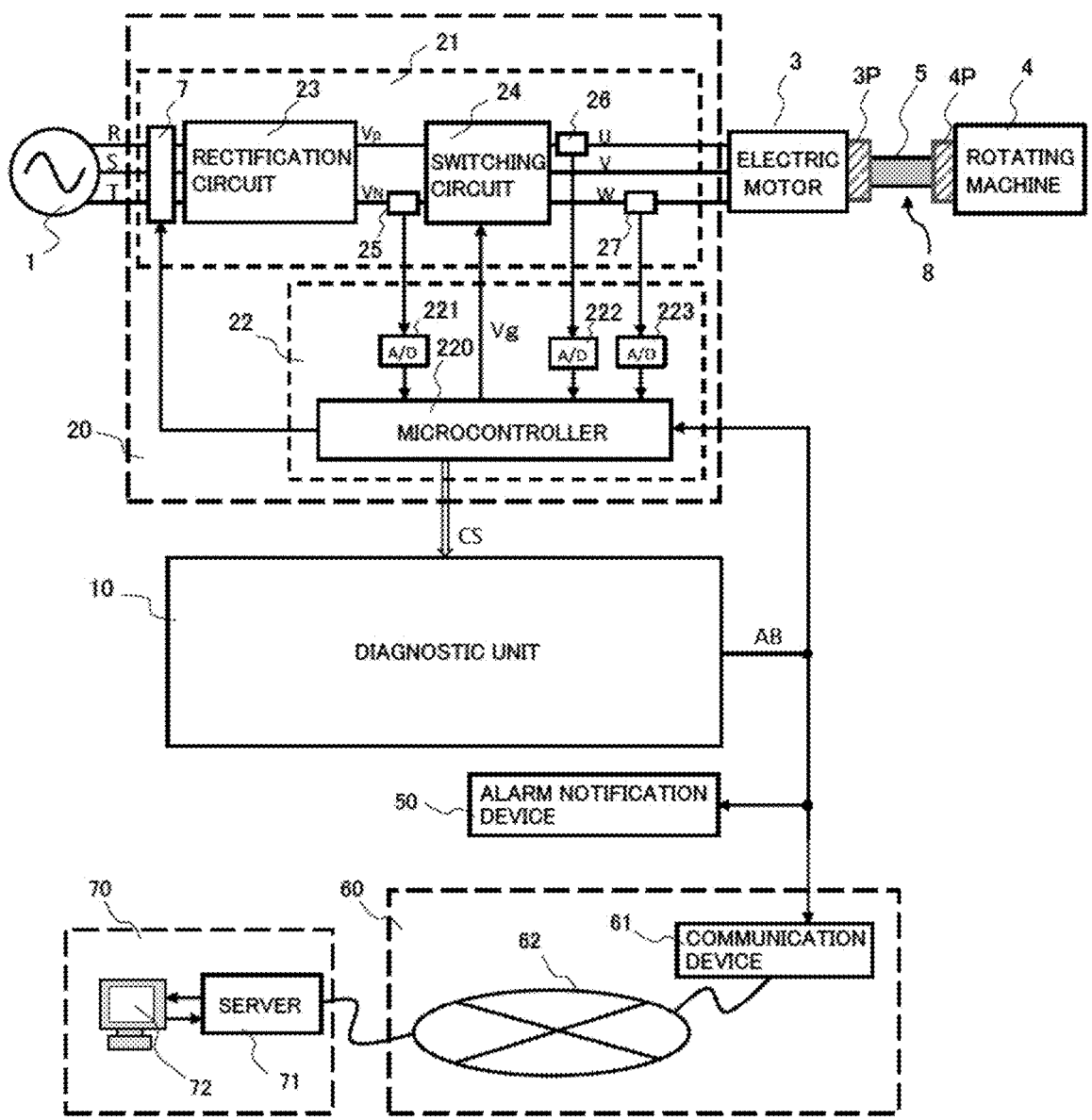
FIG. 5 is a view illustrating a rotating machine drive system according to a second embodiment of the present invention.

Next, a second embodiment of the present invention will be described with reference to FIGS. 5 and 6. FIG. 5 is a view illustrating a rotating machine drive system according to the second embodiment of the present invention. FIG. 6 shows waveform graphs of electrical information used for description of an operation of the second embodiment.

In the second embodiment of the present invention, an electric motor control device 20 by which electric power to be supplied to the electric motor 3 is supplied via a power conversion device 21 is provided, and the diagnostic unit 10 uses a part of a calculation output of the electric motor control device 20 to perform an abnormality diagnosis. The second embodiment differs in the configurations from the first embodiment described above. The other points are the same as those of the first embodiment. Therefore, here, description of the items which have been already described in the first embodiment will be omitted, and unique configurations or operations of the second embodiment will be mainly described.

(Configuration of Rotating Drive System)

In FIG. 5, the same reference signs are assigned to the same apparatuses as those in FIG. 1, and description thereof will be omitted. The electric motor control device 20 includes the power conversion device 21, and a controller 22 for control that controls the power conversion device 21. The power conversion device 21 includes a rectification circuit 23 that converts the AC power supply 1 into a DC power supply; a switching circuit 24 that applies three phase voltages (U, V, and W) to the electric motor 3 based on a voltage command Vg from the controller 22; a current sensor 25 that detects a DC current; and current sensors 26 and 27 that measure the phase current of a current supplied to the electric motor 3. Incidentally, details of the rectification circuit 23 are not illustrated, but as well known, the rectification circuit 23 uses diode bridges and capacitors to rectify an AC voltage to a DC voltage. The controller 22 outputs the voltage command Vg for controlling the rotational speed of the electric motor 3 based on a DC current Idca, a U-phase current Iua, and a W-phase current Iwa measured by the current sensors 25 to 27. In addition, the controller 22 transmits electrical information CS, such as currents acquired by the current sensors or control information used to control the electric motor, to the diagnostic unit 10.

(Description of Controller of Electric Motor Control Device)

Next, processing in the controller 22 will be described. Detection signals (analog signals) of the current sensors 25 to 27 are input to a microcontroller 220 via AD converters 221 to 223. In the microcontroller 220, a voltage command of electric power supplied to the electric motor 3 is calculated from the input signals.

Namely, in the microcontroller 220, the U-phase current Iu and the W-phase current Iw are converted into a torque current Iq correlated with torque and a magnetic flux current Id correlated with a magnetic flux on a dq-axis by rotational coordinate conversion. The rotational coordinate conversion equation follows equation (6).

[Formula 1]

$$\begin{bmatrix} Id \\ Iq \end{bmatrix} = \begin{bmatrix} \cos\theta & \sin\theta \\ -\sin\theta & \cos\theta \end{bmatrix} \begin{bmatrix} 1 & -1/2 & -1/2 \\ 0 & \sqrt{3}/2 & -\sqrt{3}/2 \end{bmatrix} \begin{bmatrix} Iu \\ Iv \\ Iw \end{bmatrix} \quad (6)$$

Here, reference sign Iv denotes a V-phase current, and the V-phase current can be obtained by equation (7) from a three-phase parallel condition.

$$Iv = -Iu - Iw \quad (7)$$

In addition, reference sign θ denotes the position of a rotor of the electric motor, and although not illustrated, a value calculated by an observer or the like which estimates the position of the rotor is used. In addition, the dq-axis is a control axis synchronized with the position θ of the rotor. Thereafter, proportional-integral control or the like is used to current control the torque current Iq to obtain a predetermined speed command.

(Abnormality Diagnosis Process in Diagnostic Unit)

By the way, the diagnostic unit 10 receives the electrical information CS from the microcontroller 220.

The electrical information CS contains the torque current Iq in addition to the U-phase current Iu, the W-phase current Iw, and the DC current Idc acquired by the current sensors 25 to 27. Incidentally, although not illustrated, in addition thereto, the control information contains the command value of the torque current Iq calculated by using proportional-integral control or the like, or a voltage command Vd or Vq calculated on the dq-axis.

Figure 6A:
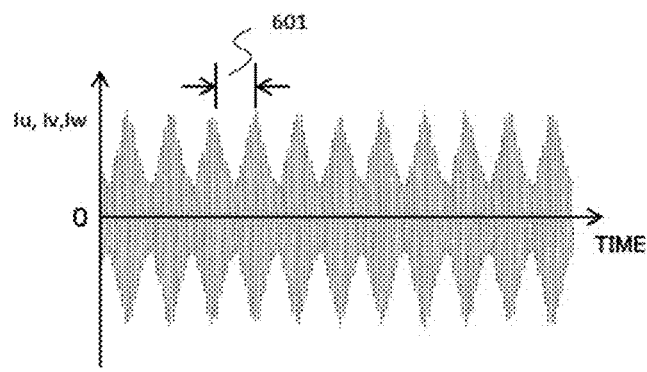
FIGS. 6A-6C show graphs for describing a driving force pattern, a phase current waveform, and a q-axis current according to the second embodiment.
Figure 6B:
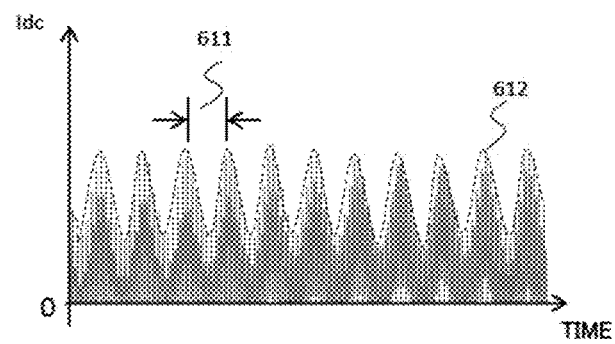
Figure 6C:
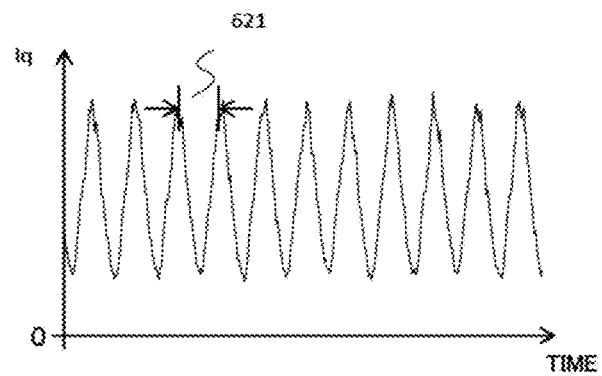

FIG. 6 shows a waveform of the U-phase current Iu, the W-phase current Iw, and the DC current Idc acquired from the microcontroller 220, a waveform of the V-phase Iv calculated in equation (7), and a waveform of the torque current Iq calculated in equation (6). FIG. 6(A) shows each phase current, and reference sign 601 denotes a pulsation period. FIG. 6(B) shows the DC current, and even with the DC current Idc, an envelope 612 changes at a pulsation period 611 (=1/fc [s]) of the load torque of the rotating machine. In addition, as shown in FIG. 6(C), the torque current Iq is subjected to rotational coordinate conversion in equation (6), so that a component of the electrical frequency fm of the electric motor is removed and the torque current Iq changes at a pulsation period 621 (=1/fc [s]) of the load torque of the rotating machine without envelope detection being performed.

The diagnostic unit 10 calculates the estimated rotational frequency fce and the reference rotational frequency fc of the rotating machine based on the received electrical information. The estimated rotational frequency fce and the reference rotational frequency fc are not illustrated in FIG.

5, but are input to the abnormality determination unit 15 (refer to FIG. 1). In the abnormality determination unit 15, the deviation Δf is obtained, and the determination of comparison between the deviation Δf and the threshold value S is performed to determine whether or not there is a transmission abnormality of the driving force in the belt drive transmission unit 8. When it has been determined that there is an abnormality, the diagnostic unit 10 outputs the abnormality detection signal AB to the outside.

(Operation of System when Abnormality is Detected)

In FIG. 5, when the diagnostic unit 10 detects an abnormality to output the abnormality detection signal AB, an operation corresponding to a transmission abnormality is executed.

In FIG. 5, the abnormality detection signal AB is transmitted to the electric motor control device 20 (controller 22 for control). When the abnormality detection signal AB is input, the controller 22 for control controls the power conversion device 21 to carry out control to reduce the speed of the electric motor 3. In this control, if necessary, the deviation Δf is input from the diagnostic unit 10, together with the abnormality detection signal AB, control to decelerate the electric motor 3 is performed to eliminate the deviation Δf, namely, to eliminate an abnormality in the belt drive transmission unit 8, or to relieve an abnormal state. In addition, instead of the deceleration control of the electric motor, in order to stop the electric motor 3 according to the abnormality detection signal AB, the circuit breaker 7 can be controlled to shut off the supply of electric power to the electric motor 3. Particularly, as described above, when the abnormality detection signal AB is a signal indicating a plurality of abnormality levels corresponding to abnormal states, the control of electric motor according to the abnormality detection signal AB corresponding to the abnormality level can be easily realized.

In addition, the abnormality detection signal AB can be supplied to the alarm notification device 50 to notify a worker of an abnormality. Alternatively, the abnormality detection signal AB can be transmitted to the server 71 in the monitoring center 70 via the information transmission unit 60 to notify a worker of an abnormality. The operation of the alarm notification device 50 or the operation of transmitting an abnormality detection signal to the monitoring center 70 is as described in detail in the first embodiment (FIG. 1).

(Modification Example of Second Embodiment)

In the second embodiment illustrated in FIG. 5, the diagnostic unit 10 receives electrical information from the controller 22 for control to perform an abnormality diagnosis using the electrical information; however, similar to the first embodiment described above, the diagnostic unit 10 may receive electrical information from a sensor, which detects a current or a voltage, to perform an abnormality diagnosis.

In addition, in the second embodiment described above, the electric motor control device 20 and the diagnostic unit 10 are separately installed; however, the diagnostic unit 10 may not be provided, and a functional operation of the diagnostic unit 10 may be executed in the electric motor control device 20. Namely, when the controller 22 for control of the electric motor control device 20 has the function of the diagnostic unit 10, it is not required to separately install the diagnostic unit 10. In that case, the configuration becomes very simple.

Incidentally, also in the second embodiment, the deviation Δf between the estimated rotational frequency fce and the reference rotational frequency fc is used to perform an abnormal diagnosis; however, instead of the deviation Δf, a ratio therebetween can also be used to similarly carry out the present invention. In that case, the threshold value used by the comparison unit 152 may be set to a value corresponding to the ratio. In addition, the degrees of a transmission abnormality may be detected as a plurality of abnormality levels.

(Effects of Second Embodiment)

As described above, the second embodiment of the present invention also has the same effects as those of the first embodiment. Particularly, in the second embodiment, when an abnormality detection signal has been output, deceleration control of the electric motor can be performed to eliminate the abnormality according to the abnormality detection signal. In addition, in the second embodiment, since electrical information can be obtained from the electric motor control device, it is not required to provide a new detection sensor that detects a current or a voltage. In addition, since the torque current Iq and the like are used, it is possible to calculate the estimated rotational frequency of the rotating machine without performing an envelope detection process.

Third Embodiment

Figure 7:
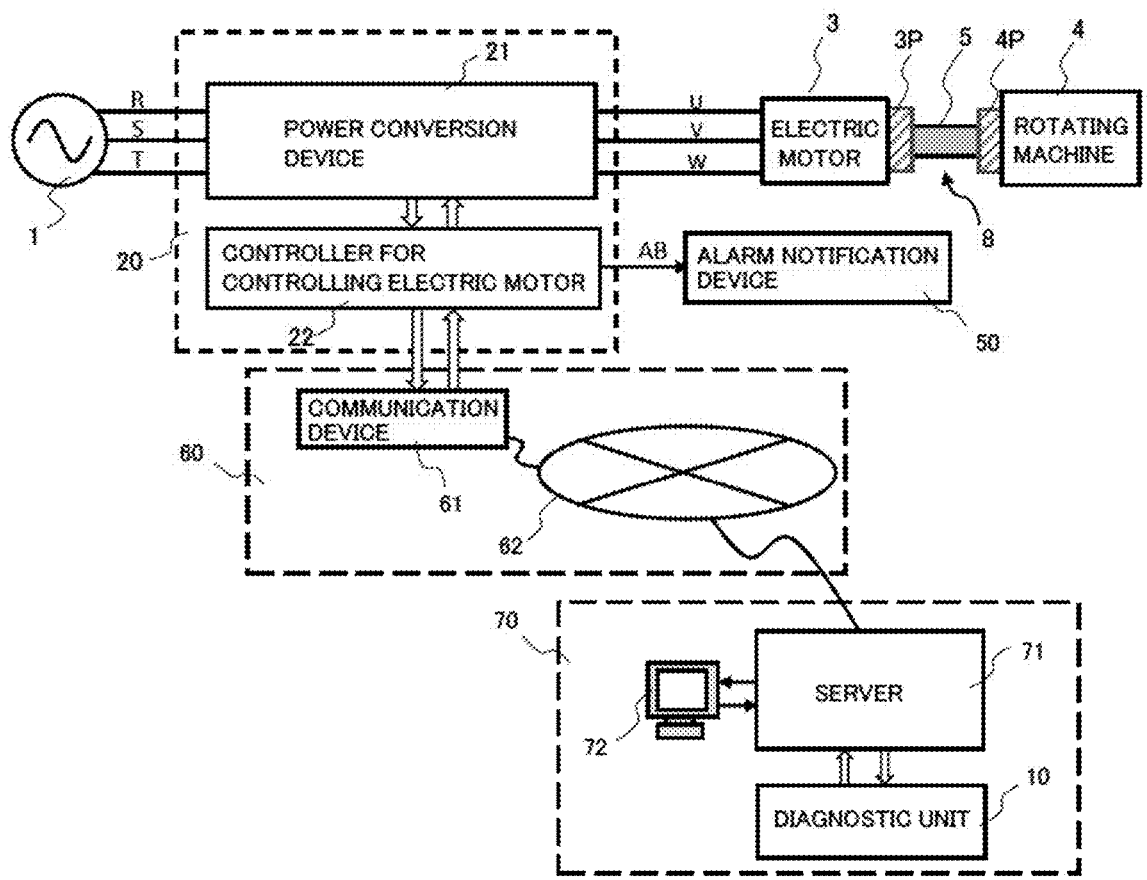
FIG. 7 is a view illustrating a rotating machine drive system according to a third embodiment of the present invention.

Next, a third embodiment of the present invention will be described with reference to FIG. 7. FIG. 7 is a view illustrating a rotating machine drive system according to the third embodiment.

In the third embodiment of the present invention, the diagnostic unit 10 which detects an abnormality in transmission of the driving force by the belt is not provided adjacent to the rotating machine, but the diagnostic unit 10 is installed in the monitoring center 70 installed at a remote location. In that respect, the third embodiment differs from the above-described embodiments. The others are the same as those of the first embodiment. Therefore, description of the items which have been already described will be omitted, and unique configurations or operations of the third embodiment will be mainly described.

In FIG. 7, the electric motor control device 20 uses the information transmission unit 60 to transmit an electrical signal, which is used for diagnosing whether or not there is an abnormality in transmission of the driving force by the belt, to the server 71 in the monitoring center 70. Incidentally, in this example, the electric motor control device 20 transmits the electrical signal for diagnosing whether or not there is an abnormality, but similar to the first embodiment, may transmit a current or a voltage to the server 71.

The server 71 stores the electrical information, and provides the electrical information to the diagnostic unit 10. The diagnostic unit 10 executes an abnormality diagnosis as described above using the electrical signal. Since operation content of the diagnosis is duplicated with the above-described content, here, description will be omitted.

When an abnormality in transmission of the driving force by the belt is detected as a result of the diagnosis, the diagnostic unit 10 outputs the abnormality detection signal AB to the server 71. The server 71 stores the abnormality detection signal AB, and transmits the abnormality detection signal AB to the controller 22 for control in the electric motor control device 20 via the information transmission unit 60.

When the signal is input, the controller 22 for control executes deceleration control or stop control of the electric motor, and outputs an abnormality detection signal to the alarm notification device 50. The alarm notification device 50 executes an alarm notification operation according to the signal.

(Effects of Third Embodiment)

According to the third embodiment, since it is possible to have the same effects as those of the above embodiments, and perform an abnormality diagnosis at a remote location, even when an environment in which the rotating machine is installed is poor, it is possible to stably execute an abnormality diagnosis operation. In addition, when the diagnostic unit 10 is configured as one function in the server 71, the configuration is simplified.

Fourth Embodiment

Figure 8:
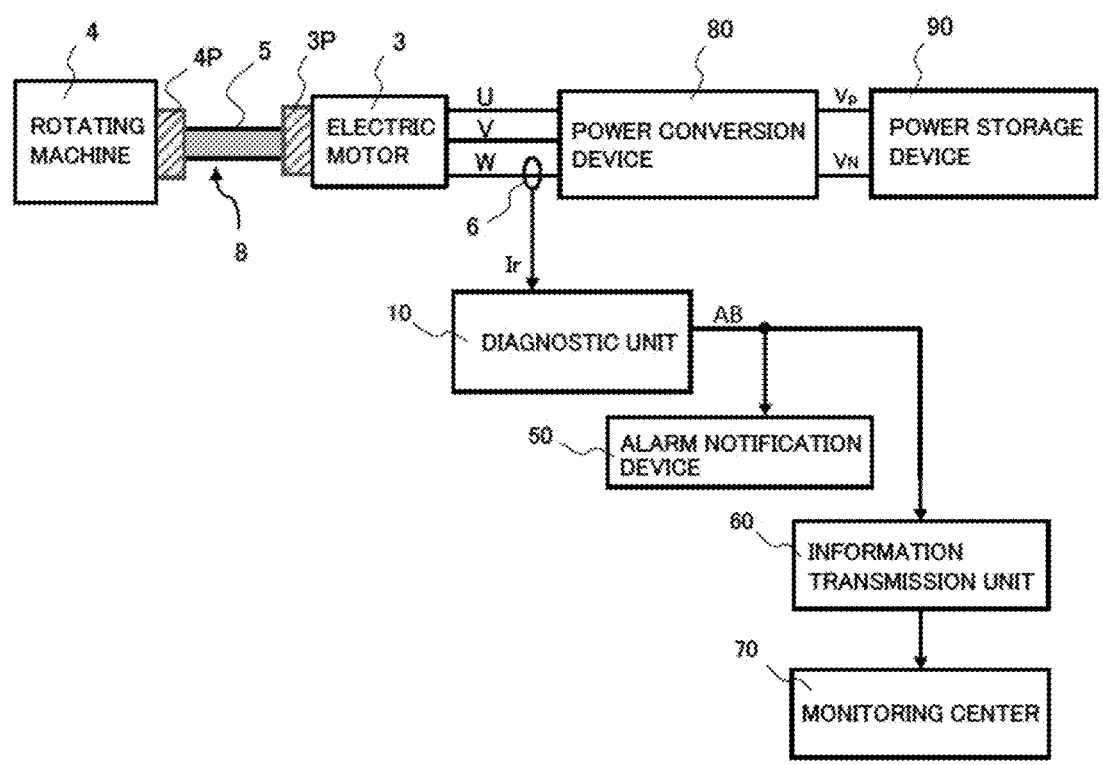
FIG. 8 is a view illustrating a rotating machine drive system according to a fourth embodiment of the present invention.

Next, a fourth embodiment of the present invention will be described with reference to FIG. 8. FIG. 8 is a view illustrating a configuration of a rotating machine drive system according to the fourth embodiment of the present invention.

In the system of each of the above-described embodiments, the rotating machine is driven by the electric motor; however, in the rotating machine drive system of the fourth embodiment of the present invention, the rotating machine drives the electric motor (generator) to generate electric power. The other points are the same as those of the above embodiments. Therefore, description of the items which have been already described will be omitted, and unique configurations or operations of the fourth embodiment will be mainly described.

In FIG. 8, the rotating machine 4 generates a mechanical rotational driving force like an internal combustion engine. The rotational driving force of the rotating machine 4 is transmitted to the electric motor 3 by the belt drive transmission unit 8 including the pulley 4P of the rotating machine 4, the belt 5, and the pulley 3P of the electric motor 3. The electric motor 3 receives the driving force to generate AC power (generates electricity). Namely, the electric motor functions as a generator. The AC power is converted into DC power by a power conversion device 80. A power storage device 90 stores the DC power. As described above, the rotating machine drive system in FIG. 8 is configured such that the rotating machine drives the electric motor and electric power generated by the electric motor is stored in the power storage device 90.

Incidentally, the electric motor 3 may generate DC power instead of AC power, and in that case, the generated electric power is directly stored in the power storage device 90 without via the power conversion device 80. In addition, the generated electric power may be supplied to a load, which requires electric power, without being stored in the power storage device 90.

By the way, the diagnostic unit 10 in this embodiment has the same configuration as that of the diagnostic unit 10 of FIG. 1. Namely, in the same technique as that in the first embodiment, the diagnostic unit 10 receives the current Ir detected by the current sensor 6, and determines whether or not the transmission of the driving force by the belt is in an abnormal state. When an abnormality has been detected as a result of the diagnosis, the abnormality detection signal AB is output.

When the abnormality detection signal AB is output, the alarm notification device 50 carries out an alarm notification operation to make a notification of the abnormality. In addition, when the monitoring center 70 is present at a remote location, the abnormality detection signal AB is transmitted via the information transmission unit 60.

Incidentally, even in the case of FIG. 8, the electric motor control device can be installed as illustrated in FIG. 5 (second embodiment). In addition, it is possible to adopt the same configuration as that in FIG. 7 (third embodiment).

(Effects of Fourth Embodiment)

As described above, also in the fourth embodiment of the present invention, similar to the first embodiment, in the rotating machine drive system in which the belt is used to transmit the driving force, it is possible to detect occurrence of a transmission abnormality of the driving force in the belt drive transmission unit based on information of electricity (current or voltage) supplied to the electric motor, which is detected during operation.

Other Embodiments

The present invention is not limited to the above-described embodiments, and can be widely carried out as long as the present invention relates to the rotating machine drive system in which the driving force is transmitted by the belt.

In addition, in each of the embodiments, the configuration has been described in which when the estimated rotational frequency of the rotating machine is calculated, an envelope detection technique and a change in frequency are used; however, the present invention is not limited thereto. For example, the time of generation of a peak interval of an envelope may be counted, and the estimated rotational frequency of the rotating machine may be calculated from the interval.

In addition, the above embodiments have been described in detail to facilitate understanding of the present invention, but are not necessarily limited to including all the described configurations. In addition, other configurations can be added to, removed from, or replaced with a part of the configurations of the embodiments.

In addition, the mechanisms or configurations described above illustrate what is considered as being required for description, and are not necessarily limited to illustrating all mechanisms or configurations.

REFERENCE SIGNS LIST

1 Power supply
2 Switch
3 Electric motor
4 Rotating machine
3P Pulley
4P Pulley
5 Belt
5 Current sensor
6 Circuit breaker
7 Belt drive transmission unit
8 Diagnostic unit
11 AD converter
12 Diagnostic controller
13 Estimated rotational frequency calculation unit
14 Reference rotational frequency calculation unit
15 Abnormality determination unit
16 Envelope detection unit
17 Frequency conversion unit
18 Maximum frequency extraction unit
20 Electric motor control device
21 Power conversion device
22 Controller for control
23 Rectification circuit
24 Switching circuit
50 Alarm notification device 60 Information transmission unit
61 Communication device
62 Communication line
70 Monitoring center
71 Server
72 Terminal device
80 Power conversion device
90 Power storage device
151 Subtraction unit
152 Comparison unit
161 Multiplier
162 Low-pass filter
220 Microcontroller
221 to 223 AD converter

The invention claimed is:

1. A rotating machine drive system comprising:
a power supply;
an electric motor that is driven by electric power supplied from the power supply;
a rotating machine;
a belt drive transmission unit including an electric motor side pulley that outputs a rotational driving force of the electric motor, a rotating machine side pulley that drives the rotating machine, and a belt that is suspended between the electric motor side pulley and the rotating machine side pulley;
an electrical information detection sensor that detects electrical information of the electric motor; and
a diagnostic unit that determines whether or not a transmission abnormality of the rotational driving force occurs in the belt drive transmission unit, based on the electrical information, and outputs an abnormality detection signal when it has been determined that there is the transmission abnormality, wherein
the electrical information detection sensor detects a current or a voltage, and the diagnostic unit calculates estimated rotational speed information of the rotating machine based on the current or the voltage, calculates a reference rotational frequency from a rotational speed of the electric motor and a ratio between a diameter of the electric motor side pulley and a diameter of the rotating machine side pulley, and uses a difference or a ratio between the estimated rotational speed information and the reference rotational frequency to determine whether or not there is the transmission abnormality.

2. The rotating machine drive system according to claim 1,
wherein in the determination of the transmission abnormality, the diagnostic unit compares the difference or the ratio with a plurality of threshold values corresponding to abnormality levels to detect a plurality of transmission abnormality levels.

3. The rotating machine drive system according to claim 1,
wherein a circuit breaker is provided which shuts off the electric power, which is supplied to the electric motor, according to the abnormality detection signal.

4. The rotating machine drive system according to claim 1,
wherein an alarm notification device is provided which makes a notification of the transmission abnormality according to the abnormality detection signal.

5. The rotating machine drive system according to claim 1,
wherein a monitoring center including the diagnostic unit and an information transmission unit which transmits the abnormality detection signal to the monitoring center are provided.

6. The rotating machine drive system according to claim 1,
wherein an electric motor control device is provided which uses a detected value of the electrical information detection sensor to control the electric motor, and the diagnostic unit receives a torque current calculated in the electric motor control device and the electrical information, and determines whether or not there is the transmission abnormality of the belt drive transmission unit, based on the torque current and the electrical information which have been received.

7. The rotating machine drive system according to claim 6,
wherein the electric motor control device has a diagnostic function of the diagnostic unit.

8. The rotating machine drive system according to claim 6,
wherein the electric motor control device controls a speed of the electric motor according to the abnormality detection signal.

9. The rotating machine drive system according to claim 1,
wherein a monitoring center including the diagnostic unit and an information transmission unit which transmits a detected value of the electrical information detection sensor are provided, and the diagnostic unit determines whether or not there is the transmission abnormality, based on the electrical information transmitted via the information transmission unit.

10. A rotating machine drive system comprising:
a rotating machine that generates a rotational driving force;
an electric motor that receives the rotational driving force to generate electric power;
a belt drive transmission unit including a rotating machine side pulley that outputs the rotational driving force, an electric motor side pulley, and a belt that is suspended between the rotating machine side pulley and the electric motor side pulley;
an electrical information detection sensor that detects electrical information of the electric power generated by the electric motor; and
a diagnostic unit that determines whether or not a transmission abnormality of the rotational driving force occurs in the belt drive transmission unit, based on the electrical information, and outputs an abnormality detection signal when it has been determined that there is the transmission abnormality, wherein
the electrical information detection sensor detects a current or a voltage, and the diagnostic unit calculates estimated rotational speed information of the rotating machine based on the current or the voltage, calculates a reference rotational frequency from a rotational speed of the electric motor and a ratio between a diameter of the electric motor side pulley and a diameter of the rotating machine side pulley, and uses a difference or a ratio between the estimated rotational speed information and the reference rotational frequency to determine whether or not there is the transmission abnormality.

11. A method for controlling a rotating machine drive system including a power supply, an electric motor that is driven by electric power supplied from the power supply, a rotating machine, a belt drive transmission unit including an electric motor side pulley that outputs a rotational driving force of the electric motor, a rotating machine side pulley that drives the rotating machine, and a belt that is suspended between the electric motor side pulley and the rotating machine side pulley, and an electrical information detection sensor that detects electrical information of the electric motor, the method comprising:

determining whether or not a transmission abnormality of the rotational driving force occurs in the belt drive transmission unit, based on the detected electrical information; and outputting an abnormality detection signal when it has been determined that there is the transmission abnormality, wherein the electrical information is a current or a voltage, estimated rotational speed information of the rotating machine is calculated based on the current or the voltage, a reference rotational frequency is calculated from a rotational speed of the electric motor and a ratio between a diameter of the electric motor side pulley and a diameter of the rotating machine side pulley, and a difference or a ratio between the estimated rotational speed information and the reference rotational frequency is used to determine whether or not there is the transmission abnormality.

12. The method for controlling a rotating machine drive system according to claim 11, wherein a speed of the electric motor is controlled according to the abnormality detection signal.

\* \* \* \* \*